US012496548B2

(12) United States Patent
Wang et al.

(10) Patent No.: US 12,496,548 B2
(45) Date of Patent: Dec. 16, 2025

(54) HYDROPHOBIC MOF-BASED POROUS LIQUID CARBON CAPTURE ABSORBENT AND PREPARATION METHOD THEREFOR

(71) Applicants: HUANENG CLEAN ENERGY RESEARCH INSTITUTE, Beijing (CN); SHANGHAI SHIDONGKOU NO. 2 POWER PLANT HUANENG INTERNATIONAL POWER CO. LTD, Shanghai (CN)

(72) Inventors: Huanjun Wang, Beijing (CN); Dongfang Guo, Beijing (CN); Jinhang Fan, Beijing (CN); Hanming Liu, Beijing (CN); Yuanxue Zhang, Beijing (CN); Ye Li, Beijing (CN); Xiaolin Lu, Beijing (CN)

(73) Assignees: HUANENG CLEAN ENERGY RESEARCH INSTITUTE, Beijing (CN); SHANGHAI SHIDONGKOU NO.2 POWER PLANT HUANENG INTERNATIONAL POWER CO. LTD, Shanghai (CN)

( * ) Notice: Subject to any disclaimer, the term of this patent is extended or adjusted under 35 U.S.C. 154(b) by 0 days.

(21) Appl. No.: 18/785,648

(22) Filed: Jul. 26, 2024

(65) Prior Publication Data

US 2024/0382899 A1 Nov. 21, 2024

Related U.S. Application Data

(63) Continuation of application No. PCT/CN2023/074718, filed on Feb. 7, 2023.

(30) Foreign Application Priority Data

May 16, 2022 (CN) .......................... 202210530341.4

(51) Int. Cl.
*B01D 53/02* (2006.01)
*B01D 53/04* (2006.01)
(Continued)

(52) U.S. Cl.
CPC ......... *B01D 53/1493* (2013.01); *B01D 53/04* (2013.01); *B01D 53/1475* (2013.01);
(Continued)

(58) Field of Classification Search
CPC .. B01D 2252/2026; B01D 2252/20473; B01D 2252/504; B01D 2252/60;
(Continued)

(56) References Cited

U.S. PATENT DOCUMENTS 9,138,719 B1 9/2015 Eddaoudi et al.
10,307,747 B2 * 6/2019 Falkowski ............ C07C 5/2562
(Continued)

FOREIGN PATENT DOCUMENTS

CN 103071364 A 5/2013
CN 105013292 A 11/2015
(Continued)

OTHER PUBLICATIONS

English translation of First Office Action for CN202210530341.4, dated Apr. 26, 2023.
(Continued)

*Primary Examiner* — Christopher P Jones
(74) *Attorney, Agent, or Firm* — Maginot, Moore & Beck, LLP

(57) ABSTRACT

A hydrophobic MOF-based porous liquid carbon capture absorbent is provided and includes a sterically hindered solvent and a hydrophobic MOFs modified material dispersed in the sterically hindered solvent. A mass percent of the hydrophobic MOFs modified material in the hydrophobic MOF-based porous liquid carbon capture absorbent is
(Continued)

5% to 20%. The hydrophobic MOFs modified material is prepared by a method comprising following steps: dispersing an MOFs material, a surface modifier and a catalyst in an organic solvent, and mixing them evenly, followed by a standing reaction to obtain the hydrophobic MOFs modified material.

10 Claims, 2 Drawing Sheets

(51) Int. Cl.
    *B01D 53/14*     (2006.01)
    *B01J 20/22*     (2006.01)
    *B01J 20/28*     (2006.01)
    *B01J 20/30*     (2006.01)

(52) U.S. Cl.
    CPC ....... *B01J 20/226* (2013.01); *B01J 20/28026* (2013.01); *B01J 20/3085* (2013.01); *B01D 2252/2026* (2013.01); *B01D 2252/20473* (2013.01); *B01D 2252/504* (2013.01); *B01D 2252/60* (2013.01); *B01D 2253/204* (2013.01); *B01D 2257/504* (2013.01); *B01D 2258/0283* (2013.01)

(58) Field of Classification Search
    CPC ........ B01D 2253/204; B01D 2257/504; B01D 2258/0283; B01D 53/02; B01D 53/04; B01D 53/1475; B01D 53/1493; B01J 20/20; B01J 20/226; B01J 20/28026; B01J 20/30; B01J 20/3085; B01J 20/3204; Y02C 20/40
See application file for complete search history.

(56) References Cited

U.S. PATENT DOCUMENTS

| | | | |
|---|---|---|---|
| 10,518,257 | B2 * | 12/2019 | Falkowski ............. B01J 31/185 |
| 2013/0032160 | A1 * | 2/2013 | Bromberg ............. B01J 20/226 |
| | | | 131/334 |
| 2013/0197235 | A1 * | 8/2013 | Thompson ............. B01J 20/226 |
| | | | 548/103 |
| 2016/0361702 | A1 * | 12/2016 | Cohen .................... B01J 20/262 |
| 2018/0318817 | A1 * | 11/2018 | Falkowski ............. B01J 20/226 |
| 2018/0345245 | A1 * | 12/2018 | Maurer .................. B01J 20/226 |
| 2021/0016232 | A1 * | 1/2021 | Liu ........................ B32B 18/00 |
| 2021/0101876 | A1 * | 4/2021 | Fang ....................... B01J 20/30 |
| 2021/0268476 | A1 * | 9/2021 | Casaban-Julian ........................... B01J 20/28064 |

FOREIGN PATENT DOCUMENTS

| | | |
|---|---|---|
| CN | 109174012 A | 1/2019 |
| CN | 110479044 A | 11/2019 |

OTHER PUBLICATIONS

International Search Report and Written Opinion for corresponding PCT/CN2023/074718, mailed May 16, 2023. (Chinese and English language document). (17 pages).

Office Action for corresponding application CN202210530341.4, mailed Apr. 26, 2023. (Chinese and English language document). (10 pages).

* cited by examiner

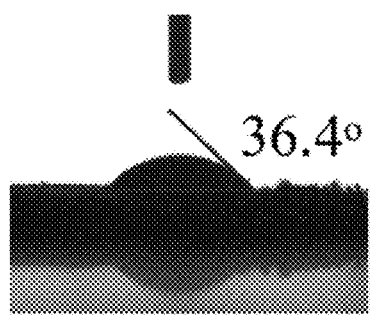 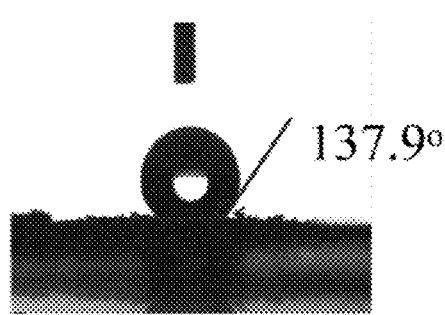
FIG. 1A	FIG. 1B
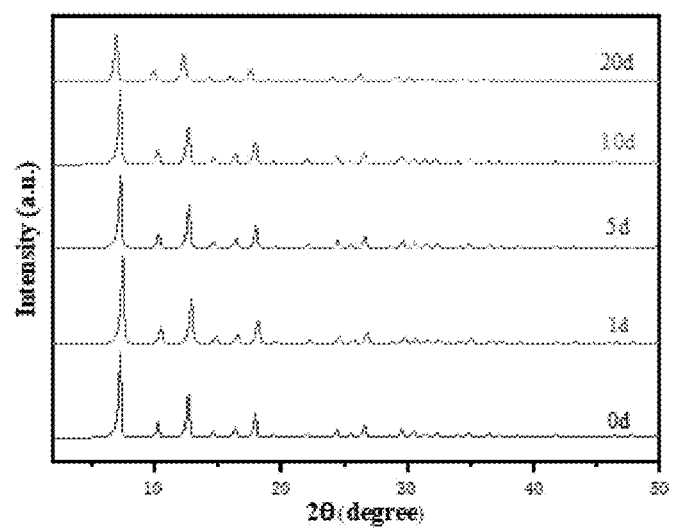
FIG. 2
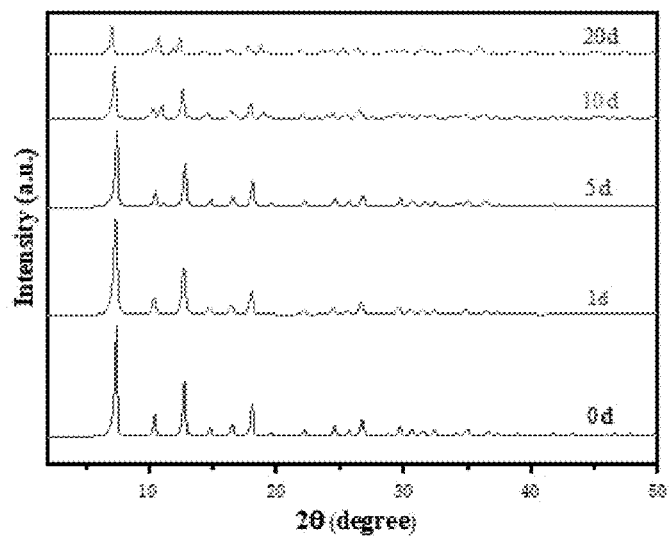
FIG. 3

HYDROPHOBIC MOF-BASED POROUS LIQUID CARBON CAPTURE ABSORBENT AND PREPARATION METHOD THEREFOR

CROSS-REFERENCE TO RELATED APPLICATION

This application is a Continuation Application of International Application PCT/CN2023/074718, filed Feb. 7, 2023, which is based on and claims priority to Chinese Patent Application No. 202210530341.4, titled "HYDROPHOBIC MOF-BASED POROUS LIQUID CARBON CAPTURE ABSORBENT AND PREPARATION METHOD THEREFOR", filed with the China National Intellectual Property Administration on May 16, 2022, the entire content of which is incorporated herein by reference.

FIELD

The present disclosure relates to the technical field of carbon dioxide capture materials, and more particularly to a hydrophobic MOF-based porous liquid carbon capture absorbent and a method for preparing a hydrophobic MOF-based porous liquid carbon capture absorbent.

BACKGROUND

In recent years, with the rapid development of economy, a demand of human for fossil fuels is increasing, resulting in the increase of $CO_2$ emissions, causing serious greenhouse effect, and seriously affecting the ecological environment and climate change. Therefore, $CO_2$ emission reduction has become an urgent issue. A $CO_2$ capture and separation technology is undoubtedly an effective technology for reducing $CO_2$ emissions, and is also regarded as one of most promising solutions.

A porous liquid is a new type of liquid material having a permanent pore structure and exhibiting a macroscopic flow state, which combines many advantages such as ordered regular pore channels of a porous solid and the fluidity of a liquid, has an extremely strong ability to absorb and dissolve gases, and shows great application potential in the field of gas capture and separation. The porous liquid is usually a porous fluid phase formed by dispersing a porous solid material (which may also be referred to as a host unit) in a suitable sterically hindered solvent. The selection of the porous solid materials is crucial to a gas capture performance of the porous liquid.

Metal organic frameworks (MOFs) are porous materials formed by the complexation of metal ions with organic ligands. The MOFs have a regular framework structure, are uniform and adjustable in pore channels, have a large specific surface area, and have a wide application prospect in fields of gas storage and separation, catalysis and the like. Since MOFs have excellent gas adsorption capacity and their structure and chemistry are adjustable, they may be used as ideal materials for a next generation of $CO_2$ capture materials. Reasonable selection of MOFs components allows for precise control over the affinity of an inner surface of the pore channels for $CO_2$, and allows for $CO_2$ capture in specific types of capture manners (pre-combustion capture, post-combustion capture or oxygen combustion capture). Some MOFs materials, such as zeolitic imidazolate frameworks (ZIFs), ZIF-67, UiO-66 and MIL-101, have a stable microporous structure, and the organic ligands constituting the framework are modifiable, which are one of best host units constituting the porous liquid.

However, since a flue gas from an actual power plant contains water vapor, and the water vapor is not easy to be removed or desorbed. After a porous liquid carbon capture absorbent is repeatedly used, water molecules in the flue gas may remain in the absorbent, which may adversely affect an adsorption performance of the absorbent. For example, in a water vapor environment, water molecules preferentially occupy active sites of the porous solid material in the porous liquid carbon capture absorbent, resulting in a significant decrease in the adsorption performance of the porous liquid carbon capture absorbent for $CO_2$. In addition, in the water vapor environment, water molecules may also have a certain destructive effect on a structure of the porous solid material, thus affecting the carbon capture performance of the porous liquid. Therefore, there is an urgent need for a porous liquid with hydrophobic properties.

SUMMARY

According to an aspect of embodiments of the present disclosure, there is provided a hydrophobic MOF-based porous liquid carbon capture absorbent. The hydrophobic MOF-based porous liquid carbon capture absorbent includes a sterically hindered solvent and a hydrophobic MOFs modified material dispersed in the sterically hindered solvent. A mass percent of the hydrophobic MOFs modified material in the hydrophobic MOF-based porous liquid carbon capture absorbent is 5% to 20%. The hydrophobic MOFs modified material is prepared by a method including following steps: dispersing an MOFs material, a surface modifier and a catalyst in an organic solvent, and mixing them evenly, followed by a standing reaction to obtain the hydrophobic MOFs modified material.

According to another aspect of embodiments of the present disclosure, there is further provided a method for preparing a hydrophobic MOF-based porous liquid carbon capture absorbent. The method includes following steps:
(1) performing an activation treatment on a hydrophobic MOFs modified material;
(2) dispersing an activated hydrophobic MOFs modified material in a mixed solution of a sterically hindered solvent and 2-methylimidazole, and magnetically stirring and mixing them to obtain the hydrophobic MOF-based porous liquid carbon capture absorbent.

The hydrophobic MOF-based porous liquid carbon capture absorbent includes the sterically hindered solvent and the hydrophobic MOFs modified material dispersed in the sterically hindered solvent. A mass percent of the hydrophobic MOFs modified material in the hydrophobic MOF-based porous liquid carbon capture absorbent is 5% to 20%. The hydrophobic MOFs modified material is prepared by a method including following steps: dispersing an MOFs material, a surface modifier and a catalyst in an organic solvent, and mixing them evenly, followed by a standing reaction to obtain the hydrophobic MOFs modified material.

According to yet another aspect of embodiments of the present disclosure, there is further provided a use of a hydrophobic MOF-based porous liquid carbon capture absorbent in a field of carbon capture. The hydrophobic MOF-based porous liquid carbon capture absorbent is used to capture and separate carbon dioxide gas in a water-containing flue gas. The hydrophobic MOF-based porous liquid carbon capture absorbent is prepared by a method including following steps:

(1) performing an activation treatment on a hydrophobic MOFs modified material;

(2) dispersing an activated hydrophobic MOFs modified material in a mixed solution of a sterically hindered solvent and 2-methylimidazole, and magnetically stirring and mixing them to obtain the hydrophobic MOF-based porous liquid carbon capture absorbent.

The hydrophobic MOF-based porous liquid carbon capture absorbent includes the sterically hindered solvent and the hydrophobic MOFs modified material dispersed in the sterically hindered solvent; wherein a mass percent of the hydrophobic MOFs modified material in the hydrophobic MOF-based porous liquid carbon capture absorbent is 5% to 20%. The hydrophobic MOFs modified material is prepared by a method including following steps: dispersing an MOFs material, a surface modifier and a catalyst in an organic solvent, and mixing them evenly, followed by a standing reaction to obtain the hydrophobic MOFs modified material.

BRIEF DESCRIPTION OF THE DRAWINGS

FIG. 1A is a schematic diagram showing a water contact angle of ZIF-8 prepared in comparative example 1.

FIG. 1B is a schematic diagram showing a water contact angle of ZIF-8(SLER) prepared in example 1 of the present disclosure.

FIG. 2 is a XRD pattern of ZIF-8(SLER) prepared in example 1 of the present disclosure when it was treated in a hydrothermal environment for different days.

FIG. 3 is a XRD pattern of ZIF-8 prepared in comparative example 1 when it was treated in a hydrothermal environment for different days.

DETAILED DESCRIPTION

Figure 4:
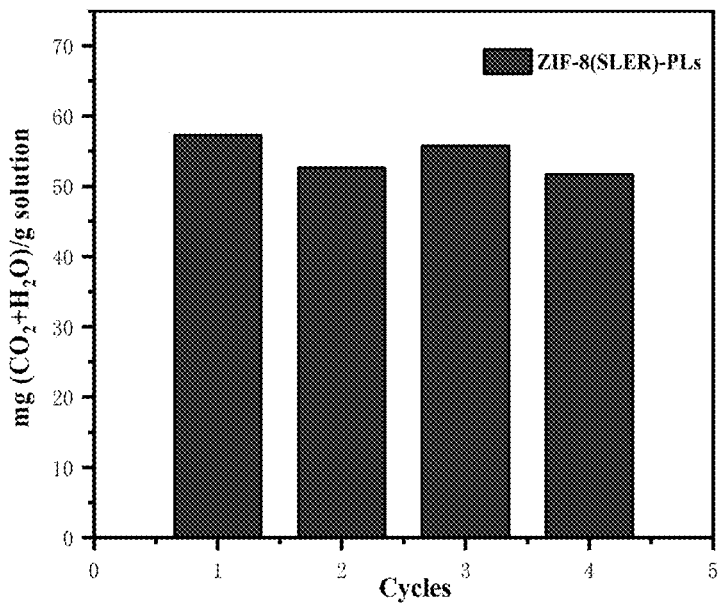
FIG. 4 is a graph showing the stability of ZIF-8(SLER)-PLs prepared in example 1 of the present disclosure during the capture of carbon dioxide in a water-containing flue gas.

Embodiments of the present disclosure are described in detail below. The embodiments are illustrated, and are intended to explain the present disclosure and cannot be construed as limiting the present disclosure.

According to an aspect of embodiments of the present disclosure, there is provided a hydrophobic MOF-based porous liquid carbon capture absorbent. The hydrophobic MOF-based porous liquid carbon capture absorbent includes a sterically hindered solvent and a hydrophobic MOFs modified material dispersed in the sterically hindered solvent. A mass percent of the hydrophobic MOFs modified material in the hydrophobic MOF-based porous liquid carbon capture absorbent is 5% to 20%. The hydrophobic MOFs modified material is prepared by a method including following steps: dispersing an MOFs material, a surface modifier and a catalyst in an organic solvent, and mixing them evenly, followed by a standing reaction to obtain the hydrophobic MOFs modified material.

The hydrophobic MOF-based porous liquid carbon capture absorbent in the embodiment of the present disclosure has following advantages: the hydrophobic MOF-based porous liquid carbon capture absorbent in the embodiment of the present disclosure has good water stability, may be used for capturing the carbon dioxide gas in the water-containing flue gas, and exhibits relatively good absorption performance and cycle performance.

In some embodiments, a mass ratio of the MOFs material, the surface modifier, the catalyst and the organic solvent is 1:1:0.7:160.

In some embodiments, the standing reaction is performed at a reaction temperature of 60° C. for a reaction time of 15 h.

In some embodiments, the MOFs material is one of: ZIF-8, ZIF-67, UiO-66 or MIL-101. The MOFs material may be ZIF-8 or ZIF-67. The surface modifier is one of: 5,6-dimethylbenzimidazole, 2-ethyl-4-methylimidazole, dimetridazole, 5-chloro-1-methyl-4-nitroimidazole, levamisole, rabenzazole, biimidazole or 1-vinylimidazole. The surface modifier may be 5,6-dimethylbenzimidazole. The catalyst is one of: triethylamine or ethylenediamine. The catalyst may be triethylamine. The organic solvent is one of: methanol, heptane, N,N-dimethylformamide, chloroform or n-hexane. The organic solvent may be methanol.

In some embodiments, the sterically hindered solvent is one of: ethylene glycol (EG), poly(dimethylsiloxane) (PDMS), 2-amino-2-methyl-propanol (AMP), branched polyethyleneimine (BPEI), $[C_6BIm_2][NTf_2]_2$, [DBU-PEG][NTf$_2$] or [Bpy][NTf$_2$]. The sterically hindered solvent may be ethylene glycol (EG).

In some embodiments, the hydrophobic MOF-based porous liquid carbon capture absorbent further includes 2-methylimidazole, and a mass percent of the 2-methylimidazole in the hydrophobic MOF-based porous liquid carbon capture absorbent is 30% to 40%. By introducing 2-methylimidazole, the solubility of carbon dioxide gas in a reaction system may be increased, which is conducive to increase a capture amount of carbon dioxide gas.

According to another aspect of embodiments of the present disclosure, there is further provided a method for preparing a hydrophobic MOF-based porous liquid carbon capture absorbent. The method includes following steps:

(1) performing an activation treatment on a hydrophobic MOFs modified material;

(2) dispersing an activated hydrophobic MOFs modified material in a mixed solution of a sterically hindered solvent and 2-methylimidazole, and magnetically stirring and mixing them to obtain the hydrophobic MOF-based porous liquid carbon capture absorbent.

The method for preparing the hydrophobic MOF-based porous liquid carbon capture absorbent in the embodiment of the present disclosure is simple in process. The activated hydrophobic MOFs modified material is dispersed in the sterically hindered solvent, and 2-methylimidazole is introduced at the same time, so that the solubility of the carbon dioxide gas in the reaction system is increased, the capture amount of the carbon dioxide gas is increased. The preparation method has low costs and low requirements on devices, and may be used for industrial mass production.

In some embodiments, in step (1), the activation treatment is performed at a temperature of 80 to 150° C. for a time of 12 to 24 h.

In some embodiments, in step (2), the magnetic stirring is performed at a temperature of 20 to 30° C. at a stirring speed of 400 to 800 r/min for a stirring time of 12 to 24 h.

According to yet another aspect of embodiments of the present disclosure, there is further provided a use of a hydrophobic MOF-based porous liquid carbon capture absorbent in a field of carbon capture. The hydrophobic MOF-based porous liquid carbon capture absorbent is used to capture and separate carbon dioxide gas in a water-containing flue gas. In the embodiments of the present disclosure, a conventional weighing method is used for carbon dioxide absorption and desorption experiments.

The hydrophobic MOF-based porous liquid carbon capture absorbent and the method for preparing the hydrophobic MOF-based porous liquid carbon capture absorbent of the present disclosure are further described in detail through specific examples.

EXAMPLE 1

A method for preparing a hydrophobic MOF-based porous liquid carbon capture absorbent includes following steps.

(1) Preparation of MOFs material (ZIF-8): in S1, 5.578 g of $Zn(NO_3)_2 \cdot 6H_2O$ (18.75 mmol) was dissolved in 150 ml of methanol, ultrasonically mixed for 10 min to obtain a metal salt methanol solution; in S2, 6.160 g of 2-methylimidazole (75 mmol) was dissolved in 150 ml of methanol, ultrasonically mixed for 10 min to obtain a 2-methylimidazole methanol solution; in S3, all the metal salt methanol solution was rapidly poured into the 2-methylimidazole methanol solution at one time, ultrasonically mixed for 10 min, and allowing to stand in a thermostat at 40° C. for 12 h to obtain a mixed solution; in S4, the mixed solution was centrifuged, fully washed with methanol, and dried in a vacuum drying oven at 60° C. for 24 h to obtain ZIF-8. An obtained ZIF-8 has an average particle size of about 150 nm.

(2) Preparation of hydrophobic MOFs modified material [ZIF-8(SLER)]: 5,6-dimethylbenzimidazole (DMBIM), triethylamine (TEA) and freshly prepared ZIF-8 nanocrystals were dispersed in methanol (MeOH) solvent (weight composition: ZIF-8:DMBIM:TEA:MeOH=1:1:0.7:160), ultrasonically mixed for 20 min. Then, a mixed solution was placed in an oven at 60° C. for 15 h to allow reaction raw materials to react sufficiently at a low temperature. After a reaction was completed, a reaction solution was washed with a proper amount of methanol for three times, and dried under vacuum to obtain a hydrophobic MOFs modified material, which was designated as ZIF-8(SLER).

(3) Activation treatment of hydrophobic MOFs modified material [ZIF-8(SLER)]:ZIF-8(SLER) was activated in a vacuum drying oven at 150° C. for 24 h.

(4) Preparation of hydrophobic MOF-based porous liquid carbon capture absorbent [ZIF-8(SLER)-PLs]: activated ZIF-8(SLER) was ultrasonically dispersed into a mixed solution of ethylene glycol and 2-methylimidazole at a ratio of ZIF-8(SLER):2-methylimidazole:ethylene glycol=15 wt %: 34 wt %: 51 wt %. Then, a mixed sample was magnetically stirred at a rotating speed of 450 r/min at 25° C. for 12 h to prepare a hydrophobic MOF-based porous liquid carbon capture absorbent, which was designated as ZIF-8(SLER)-PLs.

The hydrophobic MOFs modified material [ZIF-8(SLER)] prepared in this example was subjected to a water contact angle test, as shown in FIG. 1B. Results show that hydrophobic properties of MOFs materials are increased by post-modification using a shell ligand exchange reaction (SLER) method. Prepared ZIF-8(SLER) has a water contact angle of 137.9°, and has good hydrophobicity, which is conducive to capture and separation of carbon dioxide gas in a water-containing flue gas.

EXAMPLE 2

A method for preparing a hydrophobic MOF-based porous liquid carbon capture absorbent includes following steps.

(1) Preparation of MOFs material (ZIF-8): in S1, 5.578 g of $Zn(NO_3)_2 \cdot 6H_2O$ (18.75 mmol) was dissolved in 150 ml of methanol, ultrasonically mixed for 10 min to obtain a metal salt methanol solution; in S2, 6.160 g of 2-methylimidazole (75 mmol) was dissolved in 150 ml of methanol, ultrasonically mixed for 10 min to obtain a 2-methylimidazole methanol solution; in S3, 1 ml of metal salt methanol solution was firstly added into 2-methylimidazole methanol solution, followed by an ultrasonic treatment for 10 min, and then the remaining metal salt methanol solution was added, ultrasonically mixed for 10 min, and allowing to stand in a thermostat at 35° C. for 12 h to obtain a mixed solution; in S4, the mixed solution was centrifuged, fully washed with methanol, and dried in a vacuum drying oven at 90° C. for 24 h to obtain ZIF-8. An obtained ZIF-8 has a relatively small particle size, with an average particle size of about 80 nm.

(2) Preparation of hydrophobic MOFs modified material [ZIF-8(SLER)]: 5,6-dimethylbenzimidazole (DMBIM), triethylamine (TEA) and freshly prepared ZIF-8 nanocrystals were dispersed in methanol (MeOH) solvent (weight composition: ZIF-8:DMBIM:TEA:MeOH=1:1:0.9:200), ultrasonically mixed for 20 min. Then, a mixed solution was placed in an oven at 90° C. for 24 h to allow reaction raw materials to react sufficiently at a low temperature. After a reaction was completed, a reaction solution was washed with a proper amount of methanol for three times, and dried under vacuum to obtain a hydrophobic MOFs modified material, which was designated as ZIF-8 (SLER).

(3) Activation treatment of hydrophobic MOFs modified material [ZIF-8(SLER)]:ZIF-8(SLER) was activated in a vacuum drying oven at 130° C. for 21 h.

(4) Preparation of hydrophobic MOF-based porous liquid carbon capture absorbent [ZIF-8(SLER)-PLs]: activated ZIF-8(SLER) was ultrasonically dispersed into a mixed solution of ethylene glycol and 2-methylimidazole at a ratio of ZIF-8(SLER):2-methylimidazole: ethylene glycol=15 wt %: 34 wt %: 51 wt %. Then, a mixed sample was magnetically stirred at a rotating speed of 500 r/min at 30° C. for 20 h to prepare a hydrophobic MOF-based porous liquid carbon capture absorbent, which was designated as ZIF-8(SLER)-PLs.

EXAMPLE 3

A method for preparing a hydrophobic MOF-based porous liquid carbon capture absorbent includes following steps.

(1) Preparation of MOFs material (ZIF-67): in S1, 2.33 g of $Zn(NO_3)_2 \cdot 6H_2O$ was dissolved in 100 ml of methanol, ultrasonically mixed for 10 min to obtain a metal salt methanol solution; in S2, 2.63 g of 2-methylimidazole was dissolved in 100 ml of methanol, ultrasonically mixed for 10 min to obtain a 2-methylimidazole methanol solution; in S3, the above-mentioned two solutions were evenly mixed and stirred for 30 s, then a mixed solution was cultured at a room temperature for 24 h without stirring for a reaction; in S4, a supernatant of a reaction product was poured out, and purple precipitate was collected by centrifugation, washed with methanol for three times, and finally dried under vacuum at 80° C. to prepare ZIF-67.

(2) Preparation of hydrophobic MOFs modified material [ZIF-67(SLER)]:5,6-dimethylbenzimidazole (DMBIM), triethylamine (TEA) and freshly prepared ZIF-67 nanocrystals were dispersed in methanol (MeOH) solvent (weight composition: ZIF-8:DMBIM:TEA:MeOH=1:1:0.8:190), ultrasonically mixed for 30 min. Then, a mixed solution was placed in an oven at 90° C. for 22 h to allow reaction raw materials to react sufficiently at a low temperature. After a reaction was completed, a reaction solution was washed with a proper amount of methanol for three times, and dried under vacuum to obtain a hydrophobic MOFs modified material, which was designated as ZIF-67(SLER).

(3) Activation treatment of hydrophobic MOFs modified material [ZIF-67(SLER)]:ZIF-67(SLER) was activated in a vacuum drying oven at 130° C. for 22 h.

(4) Preparation of hydrophobic MOF-based porous liquid carbon capture absorbent [ZIF-67(SLER)-PLs]: activated ZIF-67(SLER) was ultrasonically dispersed into a mixed solution of ethylene glycol and 2-methylimidazole at a ratio of ZIF-67(SLER): 2-methylimidazole: ethylene glycol=15 wt %:34 wt %:51 wt %. Then, a mixed sample was magnetically stirred at a rotating speed of 600 r/min at 30° C. for 24 h to prepare a hydrophobic MOF-based porous liquid carbon capture absorbent, which was designated as ZIF-67 (SLER)-PLs.

COMPARATIVE EXAMPLE 1

A method for preparing a MOF-based porous liquid carbon capture absorbent includes following steps.

(1) Preparation of MOFs material (ZIF-8): in S1, 5.578 g of $Zn(NO_3)_2 \cdot 6H_2O$ (18.75 mmol) was dissolved in 150 ml of methanol, ultrasonically mixed for 10 min to obtain a metal salt methanol solution; in S2, 6.160 g of 2-methylimidazole (75 mmol) was dissolved in 150 ml of methanol, ultrasonically mixed for 10 min to obtain a 2-methylimidazole methanol solution; in S3, all the metal salt methanol solution was rapidly poured into the 2-methylimidazole methanol solution at one time, ultrasonically mixed for 10 min, and allowing to stand in a thermostat at 40° C. for 12 h to obtain a mixed solution; in S4, the mixed solution was centrifuged, fully washed with methanol, and dried in a vacuum drying oven at 60° C. for 24 h to obtain ZIF-8. An obtained ZIF-8 has an average particle size of about 150 nm.

(2) Activation treatment of MOFs material (ZIF-8): the ZIF-8 was activated in a vacuum drying oven at 150° C. for 24 h.

(3) Preparation of MOF-based porous liquid carbon capture absorbent [ZIF-8-PLs]: activated ZIF-8 was ultrasonically dispersed into a mixed solution of ethylene glycol and 2-methylimidazole at a ratio of ZIF-8:2-methylimidazole: ethylene glycol=15 wt %:34 wt %:51 wt %. Then, a mixed sample was magnetically stirred at a rotating speed of 450 r/min at 25° C. for 12 h to prepare an MOF-based porous liquid carbon capture absorbent, which was designated as ZIF-8-PLs.

The MOFs material [ZIF-8] prepared in this comparative example was subjected to a water contact angle test, as shown in FIG. 1A. Results show that the ZIF-8 without hydrophobic modification has a water contact angle of 36.4°, and has good hydrophilicity, which is not conducive to the capture and separation of the carbon dioxide gas in the water-containing flue gas.

EXPERIMENTAL EXAMPLE 1

Since a flue gas from an actual power plant contains water vapor, and the water vapor is not easy to be removed or desorbed. After the carbon capture absorbent is repeatedly used, water molecules in the flue gas may remain in the absorbent, resulting in a significant reduction in an adsorption performance of the absorbent for $CO_2$.

In this experimental example, the superiority of water stability of ZIF-8(SLER) prepared in example 1 of the present disclosure was verified by a hydrothermal experiment. 1 g of ZIF-8 (SLER) in example 1 of the present disclosure and 1 g of ZIF-8 in comparative example 1 were respectively weighed, added them into sealed containers containing 80 ml of deionized water, respectively, and placed them in an oven at 70° C. A hydrothermal reaction was carried out in the oven for a fixed time (such as 1 d, 5 d, 10 d and 20 d). After the reaction was completed, they were filtered, dried at 80° C., and subjected to XRD characterization.

FIG. 2 is a XRD pattern of ZIF-8(SLER) prepared in example 1 of the present disclosure when it was treated in a hydrothermal environment for different days. FIG. 3 is a XRD pattern of ZIF-8 prepared in comparative example 1 when it was treated in a hydrothermal environment for different days. It may be seen from FIG. 2 that ZIF-8(SLER) obtained after hydrophobically modifying ZIF-8 has diffraction peaks at 7.2°, 10.3°, 12.6°, 14.7°, 16.5° and 18.1°, corresponding to (011), (002), (112), (022), (013), and (022) crystal faces of ZIF-8, respectively, which are consistent with a crystal structure of ZIF-8 reported in the literature, indicating that ZIF-8 crystal is successfully synthesized in the present disclosure, and hydrophobic modification of ZIF-8 does not affect the crystal structure. In addition, it may be seen from FIG. 2 that after the hydrophobically modified ZIF-8(SLER) was treated in a hydrothermal environment for 20 days, a crystal structure of hydrophobically modified ZIF-8(SLER) is almost unchanged. However, it may be found from FIG. 3 that after ZIF-8 without hydrophobic modification was hydrothermal treated for 10 days, new impurity phases appear in the ZIF-8 without hydrophobic modification, indicating that a crystal structure of ZIF-8 has changed in the hydrothermal environment and the water stability of ZIF-8 is poor.

APPLICATION EXAMPLE

The hydrophobic MOF-based porous liquid carbon capture absorbent [ZIF-8(SLER)-PLs] prepared in example 1 of the present disclosure and the MOF-based porous liquid carbon capture absorbent (ZIF-8-PLs) prepared in comparative example 1 were respectively used to capture and separate carbon dioxide gas in a water-containing flue gas.

A carbon dioxide absorption and desorption experiment was carried out by using a weighing method. Specific steps are as follows: proper amounts of hydrophobic MOF-based porous liquid carbon capture absorbent [ZIF-8(SLER)-PLs] prepared in example 1 and MOF-based porous liquid carbon capture absorbent (ZIF-8-PLs) prepared in comparative example 1 were respectively weighed, added them into 10 ml absorption bottles, respectively. A mass (empty bottle+ [ZIF-8(SLER)-PLs)/or empty bottle+[ZIF-8-PLs)) was recorded. Then, the absorption bottles were moved to a water bath of a water vapor generator. A temperature of the water bath of the water vapor generator was adjusted to 46° C., and the absorption bottles were preheated for several minutes. Then, the carbon dioxide gas was introduced, a gas flowmeter was adjusted to 60 ml/min and an absorption temperature was 40° C. The absorption bottle was taken out every few minutes, water stains on the absorption bottle were wiped off and a mass of the absorption bottle was weighed, and the above operation was repeated until 120 min. Then, an air inlet and a bottle mouth of the absorption bottle were seal by using a sealing film to prevent a sample from overflow during a desorption process, and a sealed absorption bottle was desorbed in a vacuum environment of 60° C. for 20 min. The absorption bottle was taken out, the sealing film was disassembled and a mass of the absorption bottle was weighed. The above operation was repeated for 5 times.

Figure 5:
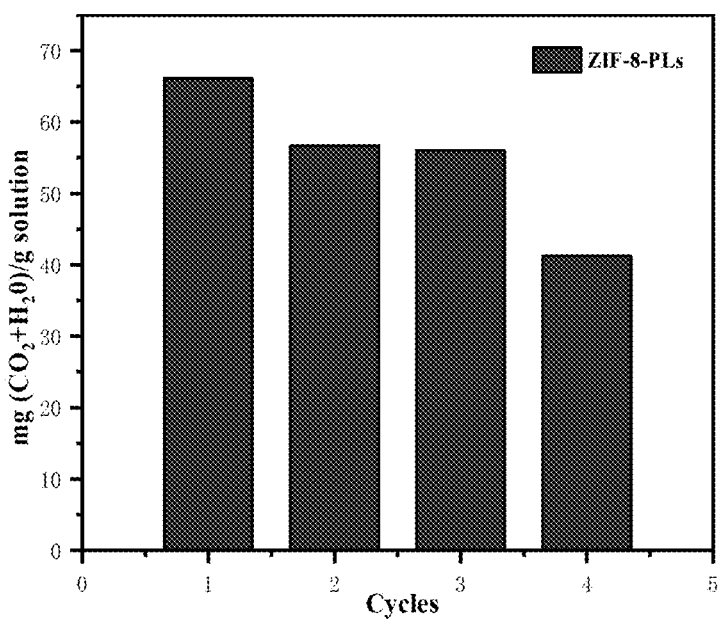
FIG. 5 is a graph showing the stability of ZIF-8-PLs prepared in comparative example 1 during the capture of carbon dioxide in a water-containing flue gas.

FIG. 4 is a graph showing the stability of hydrophobic MOF-based porous liquid carbon capture absorbent [ZIF-8 (SLER)-PLs] prepared in example 1 of the present disclosure during the capture of carbon dioxide in a water-containing flue gas. FIG. 5 is a graph showing the stability of MOF-based porous liquid carbon capture absorbent (ZIF-8-PLs) prepared in comparative example 1 during the capture of carbon dioxide in a water-containing flue gas. By comparing FIG. 4 and FIG. 5, it may be found that when a carbon dioxide concentration is 99.99% and water vapor is loaded with 10% (a water bath temperature is 46° C.), the hydrophobically modified ZIF-8 (SLER)-PLs shows a good cycle performance. However, the water stability of ZIF-8-PLs without hydrophobic modification is relatively poor, and an absorption performance of the ZIF-8-PLs is attenuated by about 30% after four carbon capture cycles. Therefore, the hydrophobic modification is conducive to improve the water stability of the porous liquid carbon capture absorbent.

The object of the present disclosure is to provide a hydrophobic MOF-based porous liquid carbon capture absorbent and a method for preparing a hydrophobic MOF-based porous liquid carbon capture absorbent. The hydrophobic MOF-based porous liquid carbon capture absorbent has good water stability, and exhibits relatively good absorption performance and cycle performance in the capture of carbon dioxide gas in a water-containing flue gas.

According to an aspect of embodiments of the present disclosure, there is provided a hydrophobic MOF-based porous liquid carbon capture absorbent. The hydrophobic MOF-based porous liquid carbon capture absorbent includes a sterically hindered solvent and a hydrophobic MOFs modified material dispersed in the sterically hindered solvent. A mass percent of the hydrophobic MOFs modified material in the hydrophobic MOF-based porous liquid carbon capture absorbent is 5% to 20%. The hydrophobic MOFs modified material is prepared by a method including following steps: dispersing an MOFs material, a surface modifier and a catalyst in an organic solvent, and mixing them evenly, followed by a standing reaction to obtain the hydrophobic MOFs modified material.

The hydrophobic MOF-based porous liquid carbon capture absorbent in the embodiment of the present disclosure has following advantages: the hydrophobic MOFs modified material in the hydrophobic MOF-based porous liquid carbon capture absorbent in the embodiment of the present disclosure has good hydrophobicity, and a prepared hydrophobic MOF-based porous liquid carbon capture absorbent may be used for capturing the carbon dioxide gas in the water-containing flue gas, and exhibits relatively good absorption performance and cycle performance.

In some embodiments, a mass ratio of the MOFs material, the surface modifier, the catalyst and the organic solvent is 1:1:(0.5 to 0.9):(150 to 200).

In some embodiments, the standing reaction is performed at a reaction temperature of 60 to 90° C. for a reaction time of 15 to 24 h.

In some embodiments, the MOFs material is one of: ZIF-8, ZIF-67, UiO-66 or MIL-101. The MOFs material may be ZIF-8 or ZIF-67. The surface modifier is one of: 5,6-dimethylbenzimidazole, 2-ethyl-4-methylimidazole, dimetridazole, 5-chloro-1-methyl-4-nitroimidazole, levamisole, rabenzazole, biimidazole or 1-vinylimidazole. The surface modifier may be 5,6-dimethylbenzimidazole. The catalyst is one of: triethylamine or ethylenediamine. The catalyst may be triethylamine. The organic solvent is one of: methanol, heptane, N,N-dimethylformamide, chloroform or n-hexane. The organic solvent may be methanol.

In some embodiments, the sterically hindered solvent is one of: ethylene glycol (EG), poly(dimethylsiloxane) (PDMS), 2-amino-2-methyl-propanol (AMP), branched polyethyleneimine (BPEI), $[C_6BIm_2][NTf_2]_2$, [DBU-PEG][NTf_2]$ or $[Bpy][NTf_2]$. The sterically hindered solvent may be ethylene glycol (EG).

In some embodiments, the hydrophobic MOF-based porous liquid carbon capture absorbent further includes 2-methylimidazole, and a mass percent of the 2-methylimidazole in the hydrophobic MOF-based porous liquid carbon capture absorbent is 30% to 40%.

According to another aspect of embodiments of the present disclosure, there is further provided a method for preparing a hydrophobic MOF-based porous liquid carbon capture absorbent. The method includes following steps:

(1) performing an activation treatment on a hydrophobic MOFs modified material;

(2) dispersing an activated hydrophobic MOFs modified material in a mixed solution of a sterically hindered solvent and 2-methylimidazole, and magnetically stirring and mixing them to obtain the hydrophobic MOF-based porous liquid carbon capture absorbent.

According to the method for preparing the hydrophobic MOF-based porous liquid carbon capture absorbent provided in the embodiment of the present disclosure, the activated hydrophobic MOFs modified material is dispersed in the sterically hindered solvent, and 2-methylimidazole is introduced at the same time, so as to increase the solubility of the carbon dioxide gas in a reaction system and improve a capture amount of the carbon dioxide gas. The preparation method is simple in process flow and easy to operate, and has low requirements on devices.

In some embodiments, in step (1), the activation treatment is performed at a temperature of 80 to 150° C. for a time of 12 to 24 h.

In some embodiments, in step (2), the magnetic stirring is performed at a temperature of 20 to 30° C. at a stirring speed of 400 to 800 r/min for a stirring time of 12 to 24 h.

According to yet another aspect of embodiments of the present disclosure, there is further provided a use of a hydrophobic MOF-based porous liquid carbon capture absorbent in a field of carbon capture. The hydrophobic MOF-based porous liquid carbon capture absorbent is used to capture and separate carbon dioxide gas in a water-containing flue gas.

According to the embodiments of the present disclosure, the hydrophobic MOF-based porous liquid carbon capture absorbent exhibits relatively good absorption performance and cycle performance in the capture of the carbon dioxide gas in the water-containing flue gas. Moreover, a crystal structure of the hydrophobic MOFs modified material remains stable in a hydrothermal environment, which is conducive to increase the water stability of the porous liquid carbon capture absorbent.

According to the method for preparing the hydrophobic MOF-based porous liquid carbon capture absorbent provided in the embodiments of the present disclosure, the water stability of the porous liquid carbon capture absorbent is improved by hydrophobic modification of the MOFs material. Moreover, the preparation method in the embodiments of the present disclosure is simple in process and easy operation, has low requirements on devices and low operation costs, and may be used for industrial mass production.

In the present disclosure, terms "an embodiment," "some embodiments," "an example," "a specific example," or "some examples," mean that a particular feature, structure, material, or characteristic described in connection with the embodiment or example is included in at least one embodiment or example of the present disclosure. The schematic expressions of the above-mentioned terms throughout this specification are not necessarily referring to the same embodiment or example. Moreover, the particular features, structures, materials, or characteristics described may be combined in any suitable manner in one or more embodiments or examples. In addition, those skilled in the art may combine the different embodiments or examples and features of different embodiments or examples described in this specification without being mutually inconsistent.

Although the embodiments of the present disclosure have been shown and described above, it is to be understood that the above-mentioned embodiments are illustrative and cannot be construed as limitations of the present disclosure, and changes, modifications, substitutions and variations made to the above-mentioned embodiments by those skilled in the art are within the scope of the present disclosure.

What is claimed is:

1. A hydrophobic MOF-based porous liquid carbon capture absorbent, comprising a sterically hindered solvent and a hydrophobic MOFs modified material dispersed in the sterically hindered solvent; wherein a mass percent of the hydrophobic MOFs modified material in the hydrophobic MOF-based porous liquid carbon capture absorbent is 5% to 20%;
   wherein the hydrophobic MOFs modified material is prepared by a method comprising following steps: dispersing an MOFs material, a surface modifier and a catalyst in an organic solvent, and mixing them evenly, followed by a standing reaction to obtain the hydrophobic MOFs modified material;
   wherein a mass ratio of the MOFs material, the surface modifier, the catalyst and the organic solvent is 1:1:(0.5 to 0.9):(150 to 200); and the standing reaction is performed at a reaction temperature of 60 to 90° C. for a reaction time of 15 to 24 h; and
   wherein the MOFs material is one of: ZIF-8, ZIF-67, UiO-66 or MIL-101; the surface modifier is one of: 5,6-dimethylbenzimidazole, 2-ethyl-4-methylimidazole, dimetridazole, 5-chloro-1-methyl-4-nitroimidazole, levamisole, rabenzazole, biimidazole or 1-vinylimidazole; the catalyst is one of: triethylamine or ethylenediamine; the organic solvent is one of: methanol, heptane, N,N-dimethylformamide, chloroform or n-hexane.

2. The hydrophobic MOF-based porous liquid carbon capture absorbent of claim 1, wherein the MOFs material is ZIF-8 or ZIF-67; the surface modifier is 5,6-dimethylbenzimidazole; the catalyst is triethylamine; the organic solvent is methanol.

3. The hydrophobic MOF-based porous liquid carbon capture absorbent of claim 1, wherein the sterically hindered solvent is one of: EG, PDMS, AMP, BPEI, $[C_6BIm_2][NTf_2]_2$, [DBU-PEG] $[NTf_2]$ or [Bpy] $[NTf_2]$.

4. The hydrophobic MOF-based porous liquid carbon capture absorbent of claim 1, wherein the hydrophobic MOF-based porous liquid carbon capture absorbent further comprises 2-methylimidazole, and a mass percent of the 2-methylimidazole in the hydrophobic MOF-based porous liquid carbon capture absorbent is 30% to 40%.

5. A method for preparing a hydrophobic MOF-based porous liquid carbon capture absorbent, comprising following steps:
   (1) performing an activation treatment on a hydrophobic MOFs modified material;
   (2) dispersing an activated hydrophobic MOFs modified material in a mixed solution of a sterically hindered solvent and 2-methylimidazole, and magnetically stirring and mixing them to obtain the hydrophobic MOF-based porous liquid carbon capture absorbent;
   wherein the hydrophobic MOF-based porous liquid carbon capture absorbent comprises the sterically hindered solvent and the hydrophobic MOFs modified material dispersed in the sterically hindered solvent; wherein a mass percent of the hydrophobic MOFs modified material in the hydrophobic MOF-based porous liquid carbon capture absorbent is 5% to 20%;
   wherein the hydrophobic MOFs modified material is prepared by a method comprising following steps: dispersing an MOFs material, a surface modifier and a catalyst in an organic solvent, and mixing them evenly, followed by a standing reaction to obtain the hydrophobic MOFs modified material;
   wherein a mass ratio of the MOFs material, the surface modifier, the catalyst and the organic solvent is 1:1:(0.5 to 0.9):(150 to 200); and the standing reaction is performed at a reaction temperature of 60 to 90° C. for a reaction time of 15 to 24 h; and
   wherein the MOFs material is one of: ZIF-8, ZIF-67, UiO-66 or MIL-101; the surface modifier is one of: 5,6-dimethylbenzimidazole, 2-ethyl-4-methylimidazole, dimetridazole, 5-chloro-1-methyl-4-nitroimidazole, levamisole, rabenzazole, biimidazole or 1-vinylimidazole; the catalyst is one of: triethylamine or ethylenediamine; the organic solvent is one of: methanol, heptane, N,N-dimethylformamide, chloroform or n-hexane;
   wherein the hydrophobic MOF-based porous liquid carbon capture absorbent further comprises 2-methylimidazole, and a mass percent of the 2-methylimidazole in the hydrophobic MOF-based porous liquid carbon capture absorbent is 30% to 40%.

6. The method for preparing the hydrophobic MOF-based porous liquid carbon capture absorbent of claim 5, wherein the activation treatment is performed at a temperature of 80 to 150° C. for a time of 12 to 24 h.

7. The method for preparing the hydrophobic MOF-based porous liquid carbon capture absorbent of claim 5, wherein the MOFs material is ZIF-8 or ZIF-67; the surface modifier is 5,6-dimethylbenzimidazole; the catalyst is triethylamine; the organic solvent is methanol.

8. The method for preparing the hydrophobic MOF-based porous liquid carbon capture absorbent of claim 5, wherein the sterically hindered solvent is one of: EG, PDMS, AMP, BPEI, $[C_6BIm_2][NTf_2]_2$, [DBU-PEG] $[NTf_2]$ or [Bpy] $[NTf_2]$.

9. The hydrophobic MOF-based porous liquid carbon capture absorbent of claim 2, wherein the hydrophobic MOF-based porous liquid carbon capture absorbent further comprises 2-methylimidazole, and a mass percent of the 2-methylimidazole in the hydrophobic MOF-based porous liquid carbon capture absorbent is 30% to 40%.

10. The hydrophobic MOF-based porous liquid carbon capture absorbent of claim 3, wherein the hydrophobic MOF-based porous liquid carbon capture absorbent further comprises 2-methylimidazole, and a mass percent of the 2-methylimidazole in the hydrophobic MOF-based porous liquid carbon capture absorbent is 30% to 40%.

* * * * *